US011022334B2

(12) United States Patent
Seiler et al.

(10) Patent No.: US 11,022,334 B2
(45) Date of Patent: Jun. 1, 2021

(54) OPERATIONAL ENVELOPE CONTROL OF AN HVAC COMPRESSOR

(71) Applicant: Johnson Controls Technology Company, Auburn Hills, MI (US)

(72) Inventors: Aron M. Seiler, Freeland, MD (US); Nicholas P. Mislak, Bel Air, MD (US); Chandra S. Yelamanchili, York, PA (US); Rajiv K. Karkhanis, York, PA (US); Nathan T. Ostrye, Milwaukee, WI (US)

(73) Assignee: Johnson Controls Technology Company, Auburn Hills, MI (US)

( * ) Notice: Subject to any disclaimer, the term of this patent is extended or adjusted under 35 U.S.C. 154(b) by 142 days.

(21) Appl. No.: 16/022,287

(22) Filed: Jun. 28, 2018

(65) Prior Publication Data
US 2019/0331356 A1    Oct. 31, 2019

Related U.S. Application Data

(60) Provisional application No. 62/662,647, filed on Apr. 25, 2018.

(51) Int. Cl.
*F24F 11/64*        (2018.01)
*F24F 11/38*        (2018.01)
(Continued)

(52) U.S. Cl.
CPC .............. *F24F 11/38* (2018.01); *F24F 11/56* (2018.01); *F24F 11/61* (2018.01); *F24F 11/64* (2018.01);
(Continued)

(58) Field of Classification Search
None
See application file for complete search history.

(56) References Cited

U.S. PATENT DOCUMENTS 5,355,691 A * 10/1994 Sullivan .............. F04D 27/0284
62/201
6,301,911 B1   10/2001 Reason et al.
(Continued)

FOREIGN PATENT DOCUMENTS

WO          9902925         1/1999

*Primary Examiner* — Bernard G Lindsay
(74) *Attorney, Agent, or Firm* — Fletcher Yoder, P.C.

(57) ABSTRACT

A heating, ventilation, and air conditioning (HVAC) system includes a compressor having a discharge port and a suction port, a first sensor configured to provide feedback corresponding to a first temperature of the working fluid exiting the compressor proximate the discharge port, a second sensor configured to provide feedback corresponding to a second temperature of the working fluid entering the compressor proximate the suction port, and an automation controller storing data indicative of an operational envelope. The operational envelope defines compressor operation coordinates corresponding to a range of suction temperatures and a range of discharge temperatures inside and outside of a target region of the operational envelope, and the automation controller is configured to control a target range of compressor speeds based on a comparison of the target region to an operation coordinate defined by the feedback from the first sensor and the feedback from the second sensor.

22 Claims, 11 Drawing Sheets

(51) Int. Cl.
*F24F 11/56* (2018.01)
*F24F 11/61* (2018.01)
*F24F 11/65* (2018.01)
*G05B 19/042* (2006.01)
*F24F 140/20* (2018.01)

(52) U.S. Cl.
CPC ............ *F24F 11/65* (2018.01); *G05B 19/042* (2013.01); *F24F 2140/20* (2018.01); *G05B 2219/2614* (2013.01)

(56) References Cited

U.S. PATENT DOCUMENTS

| | | | |
|---|---|---|---|
| 6,318,100 B1 | 11/2001 | Brendel et al. | |
| 6,321,549 B1 | 11/2001 | Reason et al. | |
| 6,691,524 B2 | 2/2004 | Brooke | |
| 7,743,617 B2 | 6/2010 | Crane et al. | |
| 7,917,334 B2 | 3/2011 | Saunders | |
| 9,086,070 B2 | 7/2015 | Powell | |
| 9,667,214 B2 | 5/2017 | Groh | |
| 9,850,890 B2 | 12/2017 | Lim et al. | |
| 10,473,097 B2 * | 11/2019 | Morris | G05B 11/42 |
| 2010/0319375 A1 | 12/2010 | Matsubara et al. | |
| 2012/0010753 A1 * | 1/2012 | Schuster | F25B 49/02 700/276 |
| 2014/0260343 A1 * | 9/2014 | Rite | F25B 49/022 62/56 |
| 2015/0000636 A1 | 1/2015 | Stockbridge et al. | |
| 2015/0345813 A1 * | 12/2015 | Rite | F24F 5/001 62/56 |
| 2016/0061207 A1 * | 3/2016 | Penn, II | F04B 35/04 417/44.1 |
| 2017/0021700 A1 * | 1/2017 | Smith | B60H 1/3225 |
| 2018/0001740 A1 * | 1/2018 | Vehr | B60H 1/3205 |
| 2019/0226709 A1 * | 7/2019 | Davis, II | F25B 49/022 |

* cited by examiner

OPERATIONAL ENVELOPE CONTROL OF AN HVAC COMPRESSOR

CROSS REFERENCE TO RELATED APPLICATIONS

This application claims priority from and the benefit of U.S. Provisional Application Ser. No. 62/662,647, entitled "OPERATIONAL ENVELOPE CONTROL OF AN HVAC COMPONENT", filed Apr. 25, 2018, which is hereby incorporated by reference in its entirety for all purposes.

BACKGROUND

The present disclosure relates generally to heating, ventilation, and air conditioning (HVAC) systems, and specifically, to controlling operation of a component in HVAC systems.

This section is intended to introduce the reader to various aspects of art that may be related to various aspects of the present disclosure, which are described below. This discussion is believed to be helpful in providing the reader with background information to facilitate a better understanding of the various aspects of the present disclosure. Accordingly, it should be understood that these statements are to be read in this light, and not as admissions of prior art.

Environmental control systems are utilized in residential, commercial, and industrial environments to control environmental properties, such as temperature and humidity, for occupants of the respective environments. The environmental control system may control the environmental properties through control of an air flow delivered to and ventilated from the environment. For example, an HVAC system may transfer heat between the air flow and refrigerant flowing through the system. The HVAC system may use a compressor to pressurize the refrigerant in facilitating the heat transfer. It is now recognized that existing compressors may shut down or otherwise operate at reduced efficiencies at certain superheated or subcooled conditions of the HVAC system.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In one embodiment, a heating, ventilation, and air conditioning (HVAC) system includes a compressor having a discharge port and a suction port, a first sensor configured to provide feedback corresponding to a first temperature of the working fluid exiting the compressor proximate the discharge port, a second sensor configured to provide feedback corresponding to a second temperature of the working fluid entering the compressor proximate the suction port, and an automation controller storing data indicative of an operational envelope. The operational envelope defines compressor operation coordinates corresponding to a range of suction temperatures and a range of discharge temperatures inside and outside of a target region of the operational envelope, and the automation controller is configured to control a target range of compressor speeds based on a comparison of the target region to an operation coordinate defined by the feedback from the first sensor and the feedback from the second sensor.

In one embodiment, a heating, ventilation, and air conditioning (HVAC) system, includes a compressor having a discharge port and a suction port, where the compressor is configured to compress a working fluid, an automation controller configured to receive feedback from a first sensor corresponding to a first temperature of the working fluid exiting the compressor proximate to the discharge port of the compressor, receive feedback from a second sensor corresponding to a second temperature of the working fluid entering the compressor proximate to the suction port of the compressor, compare an operation coordinate defined by the feedback from the first sensor and the feedback from the second sensor with a target region of an operational envelope, where the operational envelope defines compressor operation coordinates corresponding to a range of suction temperatures and a range of discharge temperatures inside and outside of the target region of the operational envelope, and control a target speed range of the compressor based at least on the comparison of the operation coordinate defined by the feedback from the first sensor and the feedback from the second sensor with the target region of the operational envelope.

In one embodiment, a heating, ventilation, and air conditioning (HVAC) controller includes a tangible, non-transitory, computer-readable medium comprising computer-executable instructions which, when executed, are configured to cause a processor to receive feedback from a first sensor corresponding to a first temperature of a working fluid exiting a compressor proximate to a discharge port of the compressor, receive feedback from a second sensor corresponding to a second temperature of the working fluid entering the compressor proximate to a suction port of the compressor, compare an operation coordinate defined by the feedback from the first sensor and the feedback from the second sensor with a target region of an operational envelope, where the operational envelope defines compressor operation coordinates corresponding to a range of suction temperatures and a range of discharge temperatures inside and outside of the target region of the operational envelope, and control a target speed range of the compressor based at least on the comparison of the operation coordinate defined by the feedback from the first sensor and the feedback from the second sensor with the target region of the operational envelope.

DRAWINGS

Various aspects of this disclosure may be better understood upon reading the following detailed description and upon reference to the drawings in which.

DETAILED DESCRIPTION

Figure 1:
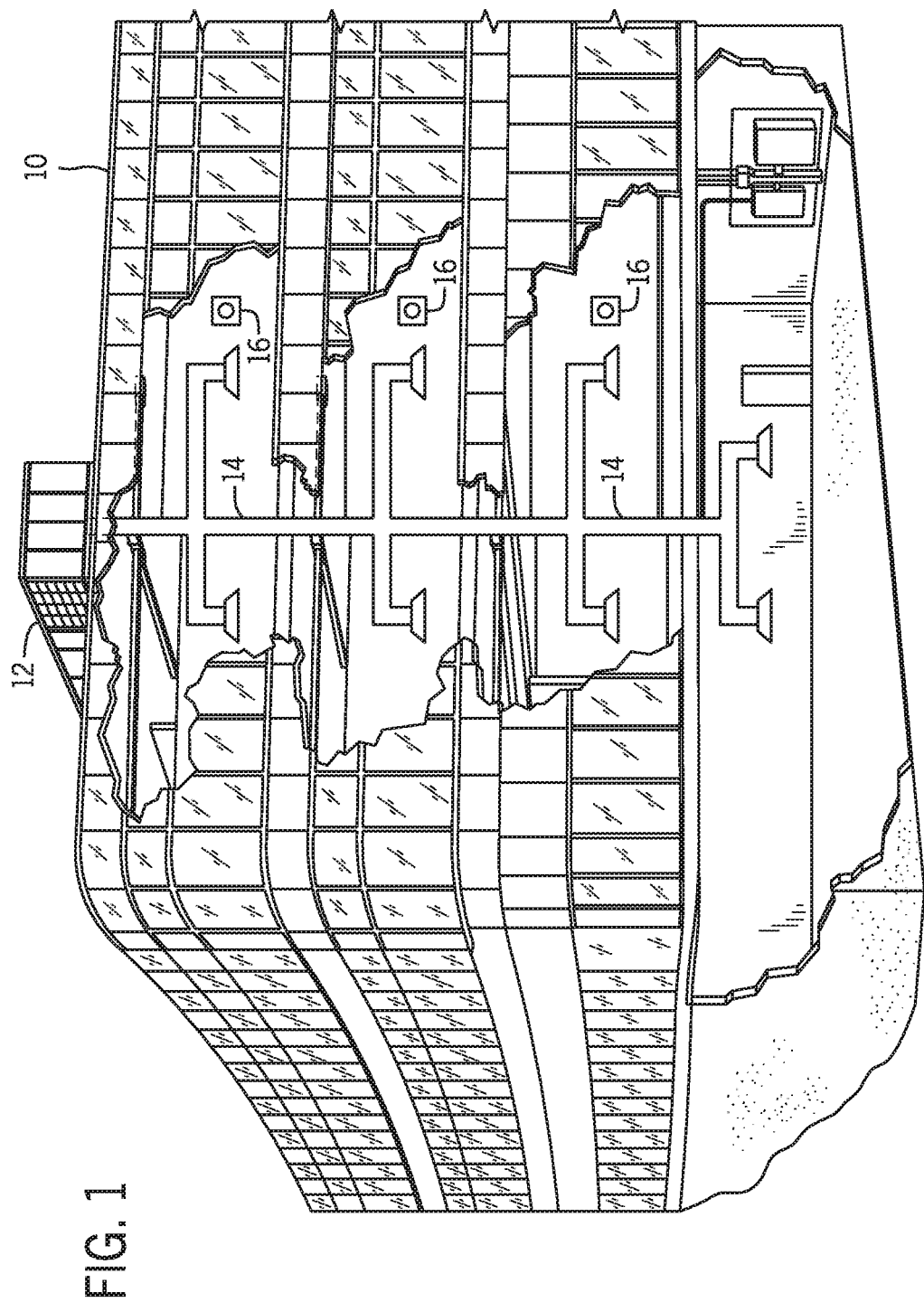
FIG. 1 is a schematic of an environmental control for building environmental management that may employ one or more HVAC units, in accordance with an aspect of the present disclosure.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

The present disclosure is directed to heating, ventilation, and air conditioning (HVAC) systems that use compressors to facilitate heat transfer between an air flow and a refrigerant. For example, the air flow may transfer heat to the refrigerant in an evaporator, which evaporates the refrigerant from a liquid phase into a gas phase. The compressor pressurizes the refrigerant to circulate the refrigerant along a refrigerant loop. The refrigerant may then be cooled in a condenser, such as via fans, and subsequently return to the evaporator to absorb additional heat from the air flow.

During operation of the HVAC system, the compressor may run at various speeds. The speed of the compressor may change based on the operational parameters of the system, such as ambient temperature, desired air flow temperature, a flow rate of the air flow, a suction temperature of refrigerant entering the compressor, a discharge temperature of refrigerant exiting the compressor, or any combination thereof. In some embodiments, the suction temperature may be a saturated suction temperature of the refrigerant, or the temperature at which the refrigerant transforms from a liquid into a gas in the evaporator. In some embodiments, the discharge temperature may be a saturated discharge temperature of the refrigerant, or the temperature at which the refrigerant transforms from a gas into a liquid in the condenser. Operating the compressor when the refrigerant is at certain suction temperatures and discharge temperatures may also affect a longevity and efficiency of the compressor.

Thus, in accordance with certain embodiments of the present disclosure, it is presently recognized that adjusting the compressor speed based on operational parameters of the system, such as suction temperature and discharge temperature, may enable the compressor to operate at a speed or a range of speeds that efficiently pressurizes the refrigerant while increasing a longevity of the compressor. Specifically, an operating speed range of the compressor may be adjusted based on feedback corresponding to the suction temperature and/or the discharge temperature of the refrigerant, to enhance operation of the compressor. Indeed, the operating speed range of the compressor may be adjusted based on any operating parameter that corresponds to suction temperature and/or discharge temperature, such as suction pressure, discharge pressure, a flow rate of refrigerant entering or exiting the compressor, a speed of a motor driving the compressor, and/or other suitable parameters.

The operating parameters may be represented graphically or tabularly as an operational compressor envelope. As used herein, the operational compressor envelope is a series of data encompassing a range of compressor operation coordinates indicative of the operating parameters inside and outside of a target region of the operational compressor envelope. As used herein, the target region represents a range of the operating parameters that limits stress placed on the compressor. For example, threshold operating parameters, operating parameter ratios, and/or allowable differences between operating parameters may be determined that ensure proper lubrication of compressor components and limit overloading of the compressor components. Values of such parameters may be determined at least via experimental testing and utilized to form the target region.

Additionally or alternatively, the target region includes a range of operating parameters that enable the compressor to operate above a threshold efficiency or within a range of compression ratios. As used herein, compressor efficiency may refer to a ratio of an actual power input to a theoretical power input for an isentropic process that achieves the same pressure differential. In some embodiments, the threshold efficiency may be above 40% efficiency, above 60% efficiency, above 80% efficiency, above 90% efficiency, above 95% efficiency, or above another suitable percentage of efficiency. As used herein, a compression ratio is a ratio of discharge pressure to suction pressure. The range of compression ratios may be based on a design compression ratio of the compressor, which is determined from an operating capacity of the compressor.

Further still, the target region may be determined via a low threshold suction temperature, a low threshold discharge temperature, a low threshold compression ratio, a high threshold suction temperature, a high threshold discharge temperature, and/or a high threshold compression ratio. In some cases, the low threshold suction temperature is based on a density and/or mass flow rate of working fluid flowing through the compressor. The low threshold discharge temperature may be based on a condensation temperature of the working fluid flowing through the compressor. Additionally, the low threshold compression ratio may be based on the mass flow rate of the working fluid that leads to a low discharge superheat and/or reduced lubrication. The high threshold suction temperature may be based on forces applied to various compressor components, such as bearings. Further, the high threshold discharge temperature may be based on a voltage supplied to a motor of the compressor and/or a temperature of motor windings. Further still, the high threshold compression ratio may be based on an amount of discharge superheat or an amount of suction superheat.

In some embodiments, the operating parameters include suction temperature and discharge temperature of the refrigerant in the compressor. As such, during operation of the compressor, a current value of the suction temperature and a current value of the discharge temperature generates an operational coordinate point on a graph or a table. The operational coordinate point is compared to the target region of the operational compressor envelope. In some existing systems, when the operational coordinate point is determined to be outside of the target region, the compressor is shut down. However, embodiments of this disclosure adjust the speed range of the compressor when the operational coordinate is determined to be outside of the target region of the operational envelope, in order to attempt to return the operational coordinate point within the target region. Although this disclosure focuses on adjusting compressor speed based on the suction and discharge temperature of the refrigerant, it should be appreciated that other embodiments may include adjusting other components of HVAC systems using other operating parameters to enable the compressor to operate within the operation envelope.

Turning now to the drawings, FIG. 1 illustrates a heating, ventilation, and air conditioning (HVAC) system for building environmental management that may employ one or more HVAC units. In the illustrated embodiment, a building 10 is air conditioned by a system that includes an HVAC unit 12. The building 10 may be a commercial structure or a residential structure. As shown, the HVAC unit 12 is disposed on the roof of the building 10; however, the HVAC unit 12 may be located in other equipment rooms or areas adjacent the building 10. The HVAC unit 12 may be a single packaged unit containing other equipment, such as a blower, integrated air handler, and/or auxiliary heating unit. In other embodiments, the HVAC unit 12 may be part of a split HVAC system, such as the system shown in FIG. 3, which includes an outdoor HVAC unit 58 and an indoor HVAC unit 56.

The HVAC unit 12 is an air cooled device that implements a refrigeration cycle to provide conditioned air to the building 10. Specifically, the HVAC unit 12 may include one or more heat exchangers across which an air flow is passed to condition the air flow before the air flow is supplied to the building. In the illustrated embodiment, the HVAC unit 12 is a rooftop unit (RTU) that conditions a supply air stream, such as environmental air and/or a return air flow from the building 10. After the HVAC unit 12 conditions the air, the air is supplied to the building 10 via ductwork 14 extending throughout the building 10 from the HVAC unit 12. For example, the ductwork 14 may extend to various individual floors or other sections of the building 10. In certain embodiments, the HVAC unit 12 may be a heat pump that provides both heating and cooling to the building with one refrigeration circuit configured to operate in different modes. In other embodiments, the HVAC unit 12 may include one or more refrigeration circuits for cooling an air stream and a furnace for heating the air stream.

A control device 16, one type of which may be a thermostat, may be used to designate the temperature of the conditioned air. The control device 16 also may be used to control the flow of air through the ductwork 14. For example, the control device 16 may be used to regulate operation of one or more components of the HVAC unit 12 or other components, such as dampers and fans, within the building 10 that may control flow of air through and/or from the ductwork 14. In some embodiments, other devices may be included in the system, such as pressure and/or temperature transducers or switches that sense the temperatures and pressures of the supply air, return air, and so forth. Moreover, the control device 16 may include computer systems that are integrated with or separate from other building control or monitoring systems, and even systems that are remote from the building 10.

Figure 2:
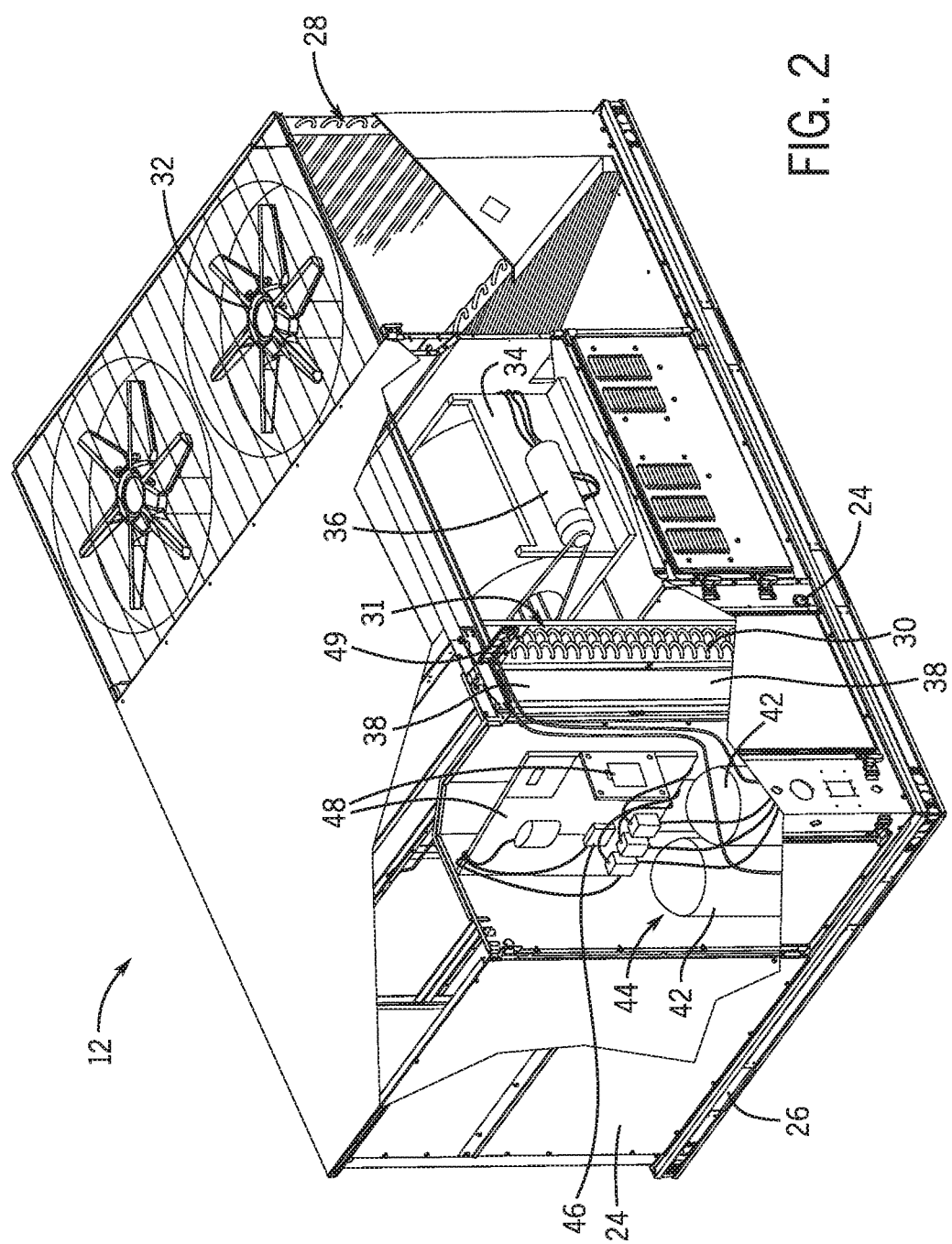
FIG. 2 is a perspective view of an embodiment of an HVAC unit that may be used in the environmental control system of FIG. 1, in accordance with an aspect of the present disclosure.

FIG. 2 is a perspective view of an embodiment of the HVAC unit 12. In the illustrated embodiment, the HVAC unit 12 is a single package unit that may include one or more independent refrigeration circuits and components that are tested, charged, wired, piped, and ready for installation. The HVAC unit 12 may provide a variety of heating and/or cooling functions, such as cooling only, heating only, cooling with electric heat, cooling with dehumidification, cooling with gas heat, or cooling with a heat pump. As described above, the HVAC unit 12 may directly cool and/or heat an air stream provided to the building 10 to condition a space in the building 10.

As shown in the illustrated embodiment of FIG. 2, a cabinet 24 encloses the HVAC unit 12 and provides structural support and protection to the internal components from environmental and other contaminants. In some embodiments, the cabinet 24 may be constructed of galvanized steel and insulated with aluminum foil faced insulation. Rails 26 may be joined to the bottom perimeter of the cabinet 24 and provide a foundation for the HVAC unit 12. In certain embodiments, the rails 26 may provide access for a forklift and/or overhead rigging to facilitate installation and/or removal of the HVAC unit 12. In some embodiments, the rails 26 may fit into "curbs" on the roof to enable the HVAC unit 12 to provide air to the ductwork 14 from the bottom of the HVAC unit 12 while blocking elements such as rain from leaking into the building 10.

The HVAC unit 12 includes heat exchangers 28 and 30 in fluid communication with one or more refrigeration circuits. Tubes within the heat exchangers 28 and 30 may circulate refrigerant, such as R-410A, through the heat exchangers 28 and 30. The tubes may be of various types, such as multichannel tubes, conventional copper or aluminum tubing, and so forth. Together, the heat exchangers 28 and 30 may implement a thermal cycle in which the refrigerant undergoes phase changes and/or temperature changes as it flows through the heat exchangers 28 and 30 to produce heated and/or cooled air. For example, the heat exchanger 28 may function as a condenser where heat is released from the refrigerant to ambient air, and the heat exchanger 30 may function as an evaporator where the refrigerant absorbs heat to cool an air stream. In other embodiments, the HVAC unit 12 may operate in a heat pump mode where the roles of the heat exchangers 28 and 30 may be reversed. That is, the heat exchanger 28 may function as an evaporator and the heat exchanger 30 may function as a condenser. In further embodiments, the HVAC unit 12 may include a furnace for heating the air stream that is supplied to the building 10. While the illustrated embodiment of FIG. 2 shows the HVAC unit 12 having two of the heat exchangers 28 and 30, in other embodiments, the HVAC unit 12 may include one heat exchanger or more than two heat exchangers.

The heat exchanger 30 is located within a compartment 31 that separates the heat exchanger 30 from the heat exchanger 28. Fans 32 draw air from the environment through the heat exchanger 28. Air may be heated and/or cooled as the air flows through the heat exchanger 28 before being released back to the environment surrounding the rooftop unit 12. A blower assembly 34, powered by a motor 36, draws air through the heat exchanger 30 to heat or cool the air. The heated or cooled air may be directed to the building 10 by the ductwork 14, which may be connected to the HVAC unit 12. Before flowing through the heat exchanger 30, the conditioned air flows through one or more filters 38 that may remove particulates and contaminants from the air. In certain embodiments, the filters 38 may be disposed on the air intake side of the heat exchanger 30 to prevent contaminants from contacting the heat exchanger 30.

The HVAC unit 12 also may include other equipment for implementing the thermal cycle. Compressors 42 increase the pressure and temperature of the refrigerant before the refrigerant enters the heat exchanger 28. The compressors 42 may be any suitable type of compressors, such as scroll compressors, rotary compressors, screw compressors, or reciprocating compressors. In some embodiments, the compressors 42 may include a pair of hermetic direct drive compressors arranged in a dual stage configuration 44. However, in other embodiments, any number of the compressors 42 may be provided to achieve various stages of heating and/or cooling. As may be appreciated, additional equipment and devices may be included in the HVAC unit 12, such as a solid-core filter drier, a drain pan, a disconnect switch, an economizer, pressure switches, phase monitors, and humidity sensors, among other things.

The HVAC unit 12 may receive power through a terminal block 46. For example, a high voltage power source may be connected to the terminal block 46 to power the equipment. The operation of the HVAC unit 12 may be governed or regulated by a control board 48. The control board 48 may include control circuitry connected to a thermostat, sensors, and alarms. One or more of these components may be referred to herein separately or collectively as the control device 16. The control circuitry may be configured to control operation of the equipment, provide alarms, and monitor safety switches. Wiring 49 may connect the control board 48 and the terminal block 46 to the equipment of the HVAC unit 12.

Figure 3:
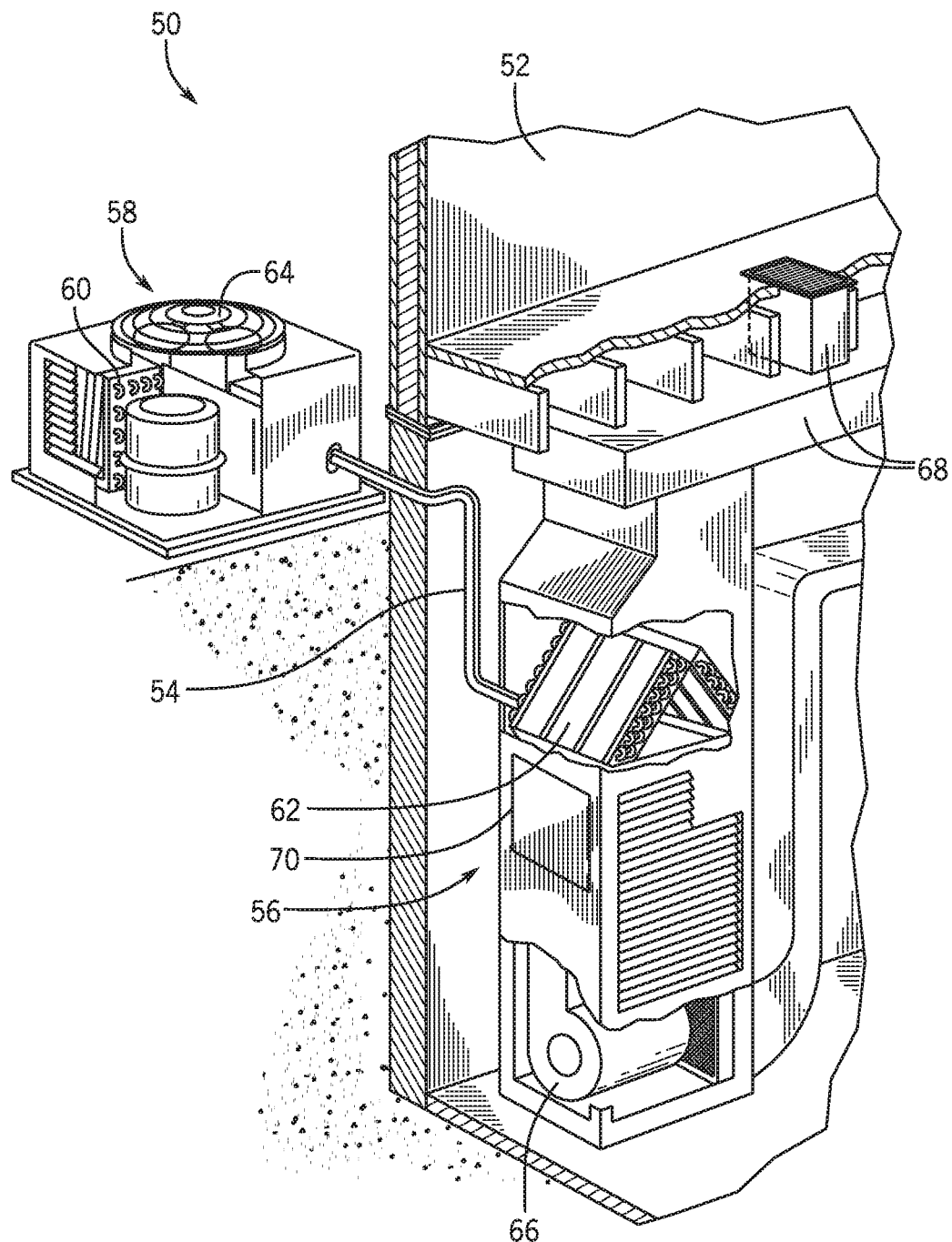
FIG. 3 is a schematic of a residential heating and cooling system, in accordance with an aspect of the present disclosure.

FIG. 3 illustrates a residential heating and cooling system 50, also in accordance with present techniques. The residential heating and cooling system 50 may provide heated and cooled air to a residential structure, as well as provide outside air for ventilation and provide improved indoor air quality (IAQ) through devices such as ultraviolet lights and air filters. In the illustrated embodiment, the residential heating and cooling system 50 is a split HVAC system. In general, a residence 52 conditioned by a split HVAC system may include refrigerant conduits 54 that operatively couple the indoor unit 56 to the outdoor unit 58. The indoor unit 56 may be positioned in a utility room, an attic, a basement, and so forth. The outdoor unit 58 is typically situated adjacent to a side of residence 52 and is covered by a shroud to protect the system components and to prevent leaves and other debris or contaminants from entering the unit. The refrigerant conduits 54 transfer refrigerant between the indoor unit 56 and the outdoor unit 58, typically transferring primarily liquid refrigerant in one direction and primarily vaporized refrigerant in an opposite direction.

When the system shown in FIG. 3 is operating as an air conditioner, a heat exchanger 60 in the outdoor unit 58 serves as a condenser for re-condensing vaporized refrigerant flowing from the indoor unit 56 to the outdoor unit 58 via one of the refrigerant conduits 54. In these applications, a heat exchanger 62 of the indoor unit functions as an evaporator. Specifically, the heat exchanger 62 receives liquid refrigerant, which may be expanded by an expansion device, and evaporates the refrigerant before returning it to the outdoor unit 58.

The outdoor unit 58 draws environmental air through the heat exchanger 60 using a fan 64 and expels the air above the outdoor unit 58. When operating as an air conditioner, the air is heated by the heat exchanger 60 within the outdoor unit 58 and exits the unit at a temperature higher than it entered. The indoor unit 56 includes a blower or fan 66 that directs air through or across the indoor heat exchanger 62, where the air is cooled when the system is operating in air conditioning mode. Thereafter, the air is passed through ductwork 68 that directs the air to the residence 52. The overall system operates to maintain a desired temperature as set by a system controller. When the temperature sensed inside the residence 52 is higher than the set point on the thermostat, or the set point plus a small amount, the residential heating and cooling system 50 may become operative to refrigerate additional air for circulation through the residence 52. When the temperature reaches the set point, or the set point minus a small amount, the residential heating and cooling system 50 may stop the refrigeration cycle temporarily.

The residential heating and cooling system 50 may also operate as a heat pump. When operating as a heat pump, the roles of heat exchangers 60 and 62 are reversed. That is, the heat exchanger 60 of the outdoor unit 58 will serve as an evaporator to evaporate refrigerant and thereby cool air entering the outdoor unit 58 as the air passes over the outdoor heat exchanger 60. The indoor heat exchanger 62 will receive a stream of air blown over it and will heat the air by condensing the refrigerant.

In some embodiments, the indoor unit 56 may include a furnace system 70. For example, the indoor unit 56 may include the furnace system 70 when the residential heating and cooling system 50 is not configured to operate as a heat pump. The furnace system 70 may include a burner assembly and heat exchanger, among other components, inside the indoor unit 56. Fuel is provided to the burner assembly of the furnace 70 where it is mixed with air and combusted to form combustion products. The combustion products may pass through tubes or piping in a heat exchanger, separate from heat exchanger 62, such that air directed by the blower 66 passes over the tubes or pipes and extracts heat from the combustion products. The heated air may then be routed from the furnace system 70 to the ductwork 68 for heating the residence 52.

Figure 4:
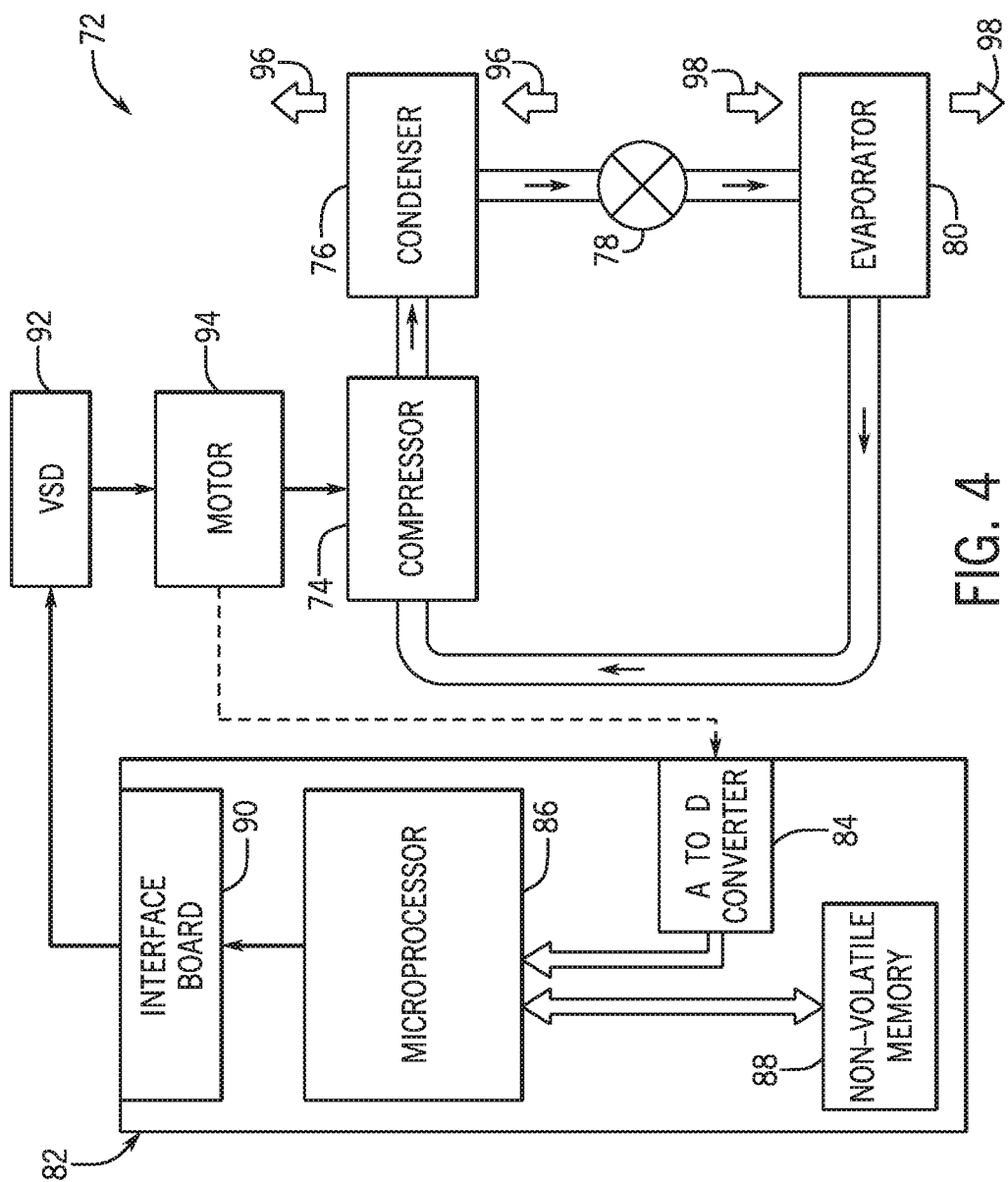
FIG. 4 is a schematic of an embodiment of a vapor compression system that can be used in any of the systems of FIGS. 1-3, in accordance with an aspect of the present disclosure.

FIG. 4 is an embodiment of a vapor compression system 72 that can be used in any of the systems described above. The vapor compression system 72 may circulate a refrigerant through a circuit starting with a compressor 74. The circuit may also include a condenser 76, an expansion valve(s) or device(s) 78, and an evaporator 80. The vapor compression system 72 may further include a control panel 82 that has an analog to digital (A/D) converter 84, a microprocessor 86, a non-volatile memory 88, and/or an interface board 90. The control panel 82 and its components may function to regulate operation of the vapor compression system 72 based on feedback from an operator, from sensors of the vapor compression system 72 that detect operating conditions, and so forth.

In some embodiments, the vapor compression system 72 may use one or more of a variable speed drive (VSDs) 92, a motor 94, the compressor 74, the condenser 76, the expansion valve or device 78, and/or the evaporator 80. The motor 94 may drive the compressor 74 and may be powered by the variable speed drive (VSD) 92. The VSD 92 receives alternating current (AC) power having a particular fixed line voltage and fixed line frequency from an AC power source, and provides power having a variable voltage and frequency to the motor 94. In other embodiments, the motor 94 may be powered directly from an AC or direct current (DC) power source. The motor 94 may include any type of electric motor that can be powered by a VSD or directly from an AC or DC power source, such as a switched reluctance motor, an induction motor, an electronically commutated permanent magnet motor, or another suitable motor.

The compressor 74 compresses a refrigerant vapor and delivers the vapor to the condenser 76 through a discharge passage. In some embodiments, the compressor 74 may be a centrifugal compressor. The refrigerant vapor delivered by the compressor 74 to the condenser 76 may transfer heat to a fluid passing across the condenser 76, such as ambient or environmental air 96. The refrigerant vapor may condense to a refrigerant liquid in the condenser 76 as a result of thermal heat transfer with the environmental air 96. The liquid refrigerant from the condenser 76 may flow through the expansion device 78 to the evaporator 80.

The liquid refrigerant delivered to the evaporator 80 may absorb heat from another air stream, such as a supply air stream 98 provided to the building 10 or the residence 52. For example, the supply air stream 98 may include ambient or environmental air, return air from a building, or a combination of the two. The liquid refrigerant in the evaporator 80 may undergo a phase change from the liquid refrigerant to a refrigerant vapor. In this manner, the evaporator 38 may reduce the temperature of the supply air stream 98 via thermal heat transfer with the refrigerant. Thereafter, the vapor refrigerant exits the evaporator 80 and returns to the compressor 74 by a suction line to complete the cycle.

In some embodiments, the vapor compression system 72 may further include a reheat coil in addition to the evaporator 80. For example, the reheat coil may be positioned downstream of the evaporator relative to the supply air stream 98 and may reheat the supply air stream 98 when the supply air stream 98 is overcooled to remove humidity from the supply air stream 98 before the supply air stream 98 is directed to the building 10 or the residence 52.

It should be appreciated that any of the features described herein may be incorporated with the HVAC unit 12, the residential heating and cooling system 50, or other HVAC systems. Additionally, while the features disclosed herein are described in the context of embodiments that directly heat and cool a supply air stream provided to a building or other load, embodiments of the present disclosure may be applicable to other HVAC systems as well. For example, the features described herein may be applied to mechanical cooling systems, free cooling systems, chiller systems, or other heat pump or refrigeration applications.

As noted above, HVAC systems may use compressors, such as the compressor 42 of FIG. 2 or the compressor 74 of FIG. 4. The compressor may pressurize refrigerant flowing through the HVAC system to facilitate heat transfer between the refrigerant and an air flow. A speed of the compressor may be adjusted to efficiently pressurize the refrigerant and/or to increase a longevity of the compressor. The operating speed of the compressor may be adjusted based on a suction temperature of the refrigerant entering the compressor and a discharge temperature of the refrigerant exiting the compressor, both of which may affect performance of the HVAC system. Monitoring the suction temperature and the discharge temperature may determine if the compressor and/or the HVAC system are operating within a target efficiency range or at another target performance level. In accordance with present embodiments, adjusting the compressor speed in response to the suction and/or discharge temperatures being outside of a target region of an operational compressor envelope may increase a longevity of the compressor. For example, the compressor may operate within a target range of speeds. If it is detected that the compressor is operating outside of the target region of the operational compressor envelope, the target range of speeds of the compressor may be adjusted until it is determined that the compressor is operating within the target region of the operational compressor envelope. As such, the target range of speeds may be adjusted based on feedback indicative of the suction and/or the discharge temperatures.

Figure 5:
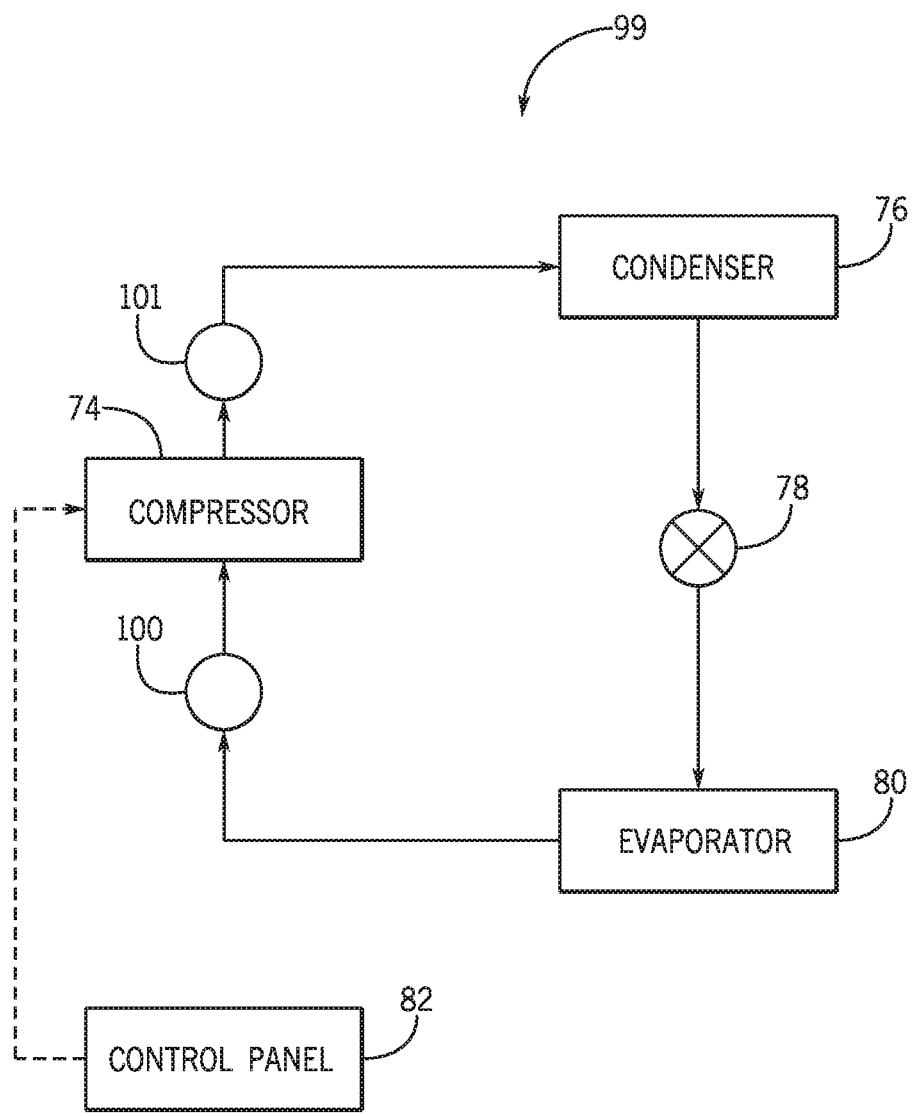
FIG. 5 is a schematic of an HVAC system configured to monitor temperature of a refrigerant, in accordance with an aspect of the present disclosure.

FIG. 5 is an embodiment of an HVAC system 99 that includes the compressor 74, which may be adjusted using control schemes of the present disclosure. For instance, it should be recognized that the control schemes disclosed herein with reference to FIGS. 5-11 may be performed using an automation controller, such as the control board 48 and/or the control panel 82. Specifically, a microprocessor of the automation controller, such as the microprocessor 86, may execute instructions stored on memory, such as the non-volatile memory 88, to perform the control schemes disclosed herein. The HVAC system 99 may be a rooftop unit such as the HVAC unit 12, a split unit such as the residential heating and cooling system 50, or another HVAC system. Similar to the vapor compression system 72 of FIG. 4, the HVAC system 99 is configured to circulate a refrigerant from the compressor 74 to the condenser 76, from the condenser 76 to the expansion valve or device 78, from the expansion valve or device 78 to the evaporator 80, and from the evaporator 80 back to the compressor 74. The operating speed of the compressor 74 may be adjusted, such as by the control panel 82. To determine if the speed of the compressor 74 should be adjusted, the HVAC system 99 includes a first sensor 100 and a second sensor 101. The first sensor 100 is configured to measure a suction temperature of the refrigerant entering the compressor 74 from the evaporator 80 and the second sensor 101 is configured to measure a discharge temperature of the refrigerant exiting the compressor 74. As such, the first sensor 100 may be positioned proximate to a suction port, or inlet, of the compressor 74 and the second sensor 101 may be positioned proximate to a discharge port, or outlet, of the compressor 74. In other words, the first sensor 100 and the second sensor 101 may be positioned with respect to the compressor 74 to monitor a temperature of the refrigerant entering the compressor and a temperature of the refrigerant exiting the compressor, respectively. The first sensor 100 and the second sensor 101 may be communicatively coupled to the control panel 82 and may be any suitable instrument configured to transmit feedback associated with the temperatures of the refrigerant. As such, the control panel 82 uses the feedback to determine if adjustments should be made to the speed of the compressor 74.

Specifically, the control panel 82 uses the feedback to generate an operational coordinate point associated with the performance of the HVAC system 99 based on suction temperatures and discharge temperatures of the refrigerant. In some embodiments, the operational coordinate is compared to an operational compressor envelope that encompasses compressor operation coordinates corresponding to a range of suction temperatures and a range of discharge temperatures inside and outside of a target region of the operational compressor envelope. The target region of the operational compressor envelope may include a set of the compressor operation coordinates that enable the HVAC system 99 to operate efficiently without imposing undesired stress on components of the HVAC system 99, and specifically the compressor 74. The operational coordinate point determined by the control panel 82 is a compressor operation coordinate that represents the current operating status of the compressor 74. Based on a comparison of the coordinate point with respect to the target region of the compressor operational envelope, the control panel 82 determines if the speed of the compressor 74 should be adjusted. For example, the control panel 82 may determine whether or not the operational coordinate point is within the target region of the operational compressor envelope or outside of the target region of the operational compressor envelope to adjust the speed of the compressor 74.

Figure 6:
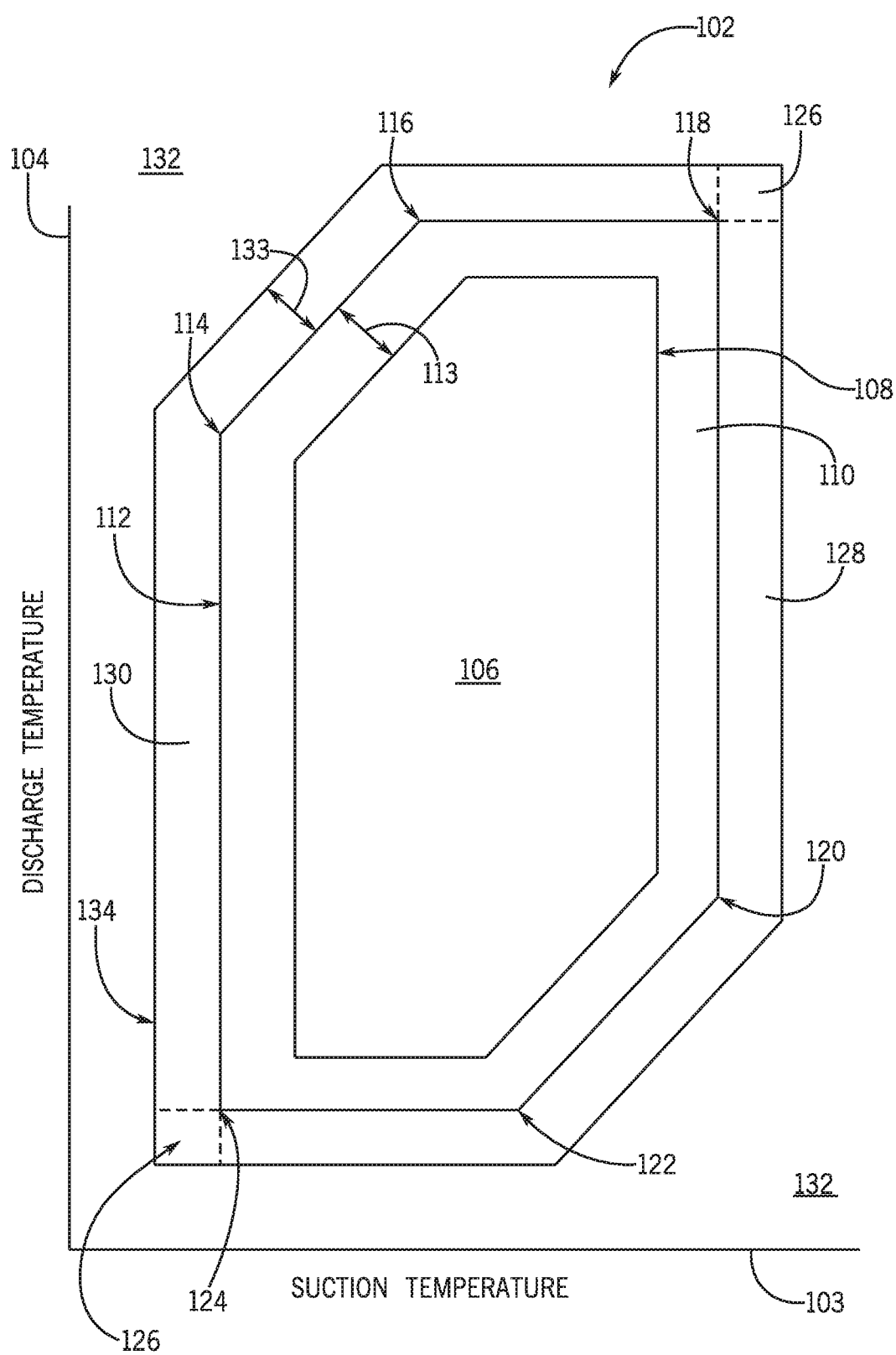
FIG. 6 is a graph of a visualization of a control scheme that may be used to control operation of a component that can be included in any of the systems of FIGS. 1-4, in accordance with an aspect of the present disclosure.

To illustrate the aforementioned operational envelope, FIG. 6 is an embodiment of a control scheme 102, or the operational compressor envelope, which visually represents the performance of the HVAC system 99 and may be used to control the compressor 74 in the HVAC system 99. The control scheme 102 includes an axis 103 representing the suction temperature of a refrigerant entering the compressor 74 and an axis 104 representing the discharge temperature of the refrigerant exiting the compressor 74. As such, an operational coordinate is determined by matching a value of the suction temperature on the axis 103 with a value of the discharge temperature on the axis 104. The location of the operational coordinate may indicate a performance of the compressor 74. For example, an inner region 106, or target region, of the control scheme 102 represents the normal operating conditions of the compressor 74 as determined by the suction and discharge temperatures. As used herein, normal operating conditions refer to operating conditions of the compressor 74 that enable the HVAC system 99 to perform efficiently without imposing undesired stress on components of the HVAC system 99. A boundary 108 defining the inner region 106 is indicative of the target temperature ranges of the refrigerant. Put in other words, operating within the inner region 106 increases a longevity of the compressor 74. When the compressor 74 is operating within the inner region 106, the speed of the compressor 74 may vary between a target range of operating speeds, including a lower threshold speed and an upper threshold speed. The lower threshold speed and the upper threshold speed may vary among different HVAC systems, and may be based on the application of the compressor 74, the application of the HVAC system 99, and/or the compressor specifications, for example. At any given time during operation within the inner region 106, the speed of the compressor 74 may be set at a value within the target range of operating speeds. While the compressor 74 is operating within the inner region 106, the lower threshold speed and the upper threshold speed may be maintained such that the target range of operating speeds is constant.

In some embodiments, a deadband region 110 is included outside of the inner region 106. As illustrated in the control scheme 102, the deadband region 110 is defined by the boundary 108 and by a boundary 112. The boundary 112 is offset from the boundary 108 by an offset value 113. In some embodiments, the offset value 113 is constant along the boundaries 108, 112, such that the boundary 112 forms substantially the same shape compared to the boundary 108. As an example, the offset value 113 may range from 0.1° F. to 5° F., or 0.08° C. to 4° C., which may depend on operating parameters of the compressor 74 and/or other components of the HVAC system 99. The offset value may also be a percentage of a suction or discharge temperature along the boundary 112, such as between 0.5% and 20%, between 1% and 15%, or between 2% and 10% of any suction temperature or any discharge temperature along the boundary 112. A speed of the compressor 74 operating within the deadband region 110 may not be adjusted even though the HVAC system 99 may operate at a reduced efficiency when compared to the inner region 106. That is, an automation controller, such as the control board 48 and/or the control panel 82, may maintain the lower threshold speed and the upper threshold speed of the target range of operating speeds when the system operates outside of the inner region 106, and within the deadband region 110, of the control scheme 102.

The boundary 112 of the deadband region 110 represents an operating condition threshold, and is defined by compressor operation coordinates 114, 116, 118, 120, 122, and 124. The coordinates 114-124 are determined based on corresponding suction and discharge temperatures. The values of the coordinates 114-124 may vary between different HVAC systems, and may be based on compressor specifications, an application of the compressor 74, other components of the HVAC system 99, or other suitable operating parameters of the HVAC system 99. In some embodiments, values of the coordinates 114-124 are determined through experimental testing and are values of suction temperatures and discharge temperatures that limit stress placed upon components of the HVAC system 99, such as the compressor 74. As such, the compressor 74 may undergo operation at a wide range of suction and discharge temperatures. The performance of the compressor 74 and/or the HVAC system 99 may be monitored to determine operating limits of the compressor 74 and/or maintain an efficiency of the compressor 74 and/or an efficiency of the HVAC system 99 above a threshold efficiency. Additionally or alternatively, the coordinates 114-124 are provided by a manufacturer of the compressor 74.

In some embodiments, the control scheme 102 includes additional deadband regions, such as outer deadband regions 126. The outer deadband regions 126 may be located outside of the deadband region 110. For example, a first outer deadband region 126 may be located at a region where the suction temperature is below the suction temperature of the boundary 112 and where the discharge temperature is below the discharge temperature of the boundary 112. A second outer deadband region 126 may be located at a region where the suction temperature is above the suction temperature of the boundary 112 and where discharge temperature is above the discharge temperature of the boundary 112. Similar to operations in the inner deadband region 110, the controller may not adjust a speed of the compressor 74 when operating in the outer deadband regions 126, such that the outer deadband regions 126 reduce frequent adjustments of the speed of the compressor 74 when operating outside of the inner region 106. In other words, the deadband region 110 and the outer deadband regions 126 maintain a speed of the compressor despite the suction and discharge temperatures being outside of the inner region 106. Accordingly, the lower threshold speed and the upper threshold speed of the target range of operating speeds are maintained when the compressor 74 operates outside of the inner region 106 and the deadband region 110.

Operation outside of the inner region 106 and the deadband region 110 may reduce the longevity of the compressor 74. For example, operating the compressor 74 when suction temperatures are greater than the boundary 112 may result in a higher circulation rate of refrigerant, which may reduce an efficiency of the HVAC system 99 and/or produce conditions that reduce the longevity of the compressor 74. Operating the compressor 74 when discharge temperatures are less than the boundary 112 may result in noise and/or also reduce the longevity of the compressor 74. As a result, the target speed range of the compressor 74 may be adjusted to maintain operation of the compressor 74 within the inner region 106.

The speed of the compressor 74 may be adjusted depending on a position of a generated compressor operation coordinate defined by a monitored suction temperature and a monitored discharge temperature of the refrigerant with respect to the control scheme 102. For example, the control scheme 102 may include a speed up region 128, or first control region, and a slow down region 130, or second control region, in addition to the deadband region 110, or third control region. The speed up region 128 represents conditions when the suction temperature is above a suction temperature threshold of the boundary 112 and/or when the discharge temperature is below a discharge temperature threshold of the boundary 112. In other words, the speed up region 128 includes conditions where the suction temperature and the discharge temperature are to the right of, or below, a portion of the boundary 112 formed by the compressor operation coordinates 118, 120, 122, and 124. When operating in the speed up region 128, the target operating speed range may be adjusted to cause the compressor 74 to operate at a higher speed than the compressor 74 would otherwise operate to achieve a given load demand. As such, the lower threshold speed of the target operating speed range may be increased.

Additionally, the slow down region 130 represents conditions when the suction temperature is below a suction temperature threshold of the boundary 112 and/or when the discharge temperature is above a discharge temperature threshold of the boundary 112. In other words, the slow down region 130 includes conditions where the suction temperature and the discharge temperature are to the left of, or above, a portion of the boundary 112 formed by the compressor operation coordinates 114, 116, 118, and 124. When operating in the slow down region 130, the target operating speed range may be adjusted to cause the compressor 74 to operate at a lower speed than the compressor 74 would otherwise operate to achieve the given load demand. As such, the upper threshold speed of the target operating speed range is reduced. The outer deadband regions 126 are positioned in between the speed up region 128 and the slow down region 130, proximate to the compressor operation coordinates 118 and 124. As such, frequent adjustment of the speed of the compressor 74 is reduced when the suction and discharge temperatures are near the compressor operation coordinate 118 or the compressor operation coordinate 124. The adjustment of the target operating speed range may also depend on where the compressor operation coordinate defined by feedback indicative of the suction and discharge temperatures is located in the speed up region 128 and/or the slow down region 130. For example, the adjustment to the upper threshold speed and/or the lower threshold speed of the target operating speed range may be greater if the compressor operation coordinate is further outside of the inner region 106 and/or the inner deadband region 110.

Furthermore, the control scheme 102 may include a shut down region 132, or fourth control region, which represents operating conditions that may significantly reduce longevity of the compressor 74. That is, the operating conditions, or compressor operation coordinates, may warrant shut down of the compressor 74 rather than an adjustment to the speed of the compressor 74 when operating in the shut down region 132. As such, if the operating conditions are determined to be in the shut down region 132, the compressor 74 may immediately begin a shut down process. The shut down region 132 may be offset from the boundary 112 by an offset amount 133. In some embodiments, the offset amount 133 is substantially similar, but opposite in direction, to the offset value 113 and may be between 0.1° F. to 5° F., or 0.08° C. to 4° C. Additionally or alternatively, the offset amount 133 may be a percentage of a suction or discharge temperature along the boundary 112, such as between 0.5% and 20%, between 1% and 15%, or between 2% and 10% of any suction temperature or any discharge temperature along the boundary 112, depending on operating parameters of the compressor 74 and/or other components of the HVAC system 99. In other embodiments, the offset amount 133 differs from the offset value 113 and may be between temperature values such as 5° F. and 10° F. or 4° C. and 8° C. As such, the shut down region 132 may create a shut down boundary 134 offset from the boundary 112, such that when the operating conditions fall outside of the shut down boundary 134, the compressor 74 is shut down by the control panel 82. In some embodiments, the offset amount 133 may be constant along the boundaries 112, 134 such that the boundary 134 forms substantially the same shape compared to the boundary 112.

Although FIG. 6 illustrates the boundary 108, the boundary 112, and the shut down boundary 134 as having a certain six-sided shape, in other embodiments, such boundaries 108, 112, and 134 may include a different shape. For example, the compressor operation coordinates 114-124 may differ in value, based on the type of compressor 74, the application of the compressor 74, other components of the HVAC system 99, another suitable parameter, or any combination thereof. As such, the values of the compressor operation coordinates 114-124 may determine the ultimate shape of the boundary 108, which may thereby change the shape of the boundary 112 and/or the shut down boundary 134 that are offset from the boundary 108. In other embodiments, the boundary 112 and/or the shut down boundary 134 may be offset from the boundary 108 in manners that change their shapes and/or values with respect to the boundary 108.

Figure 7:
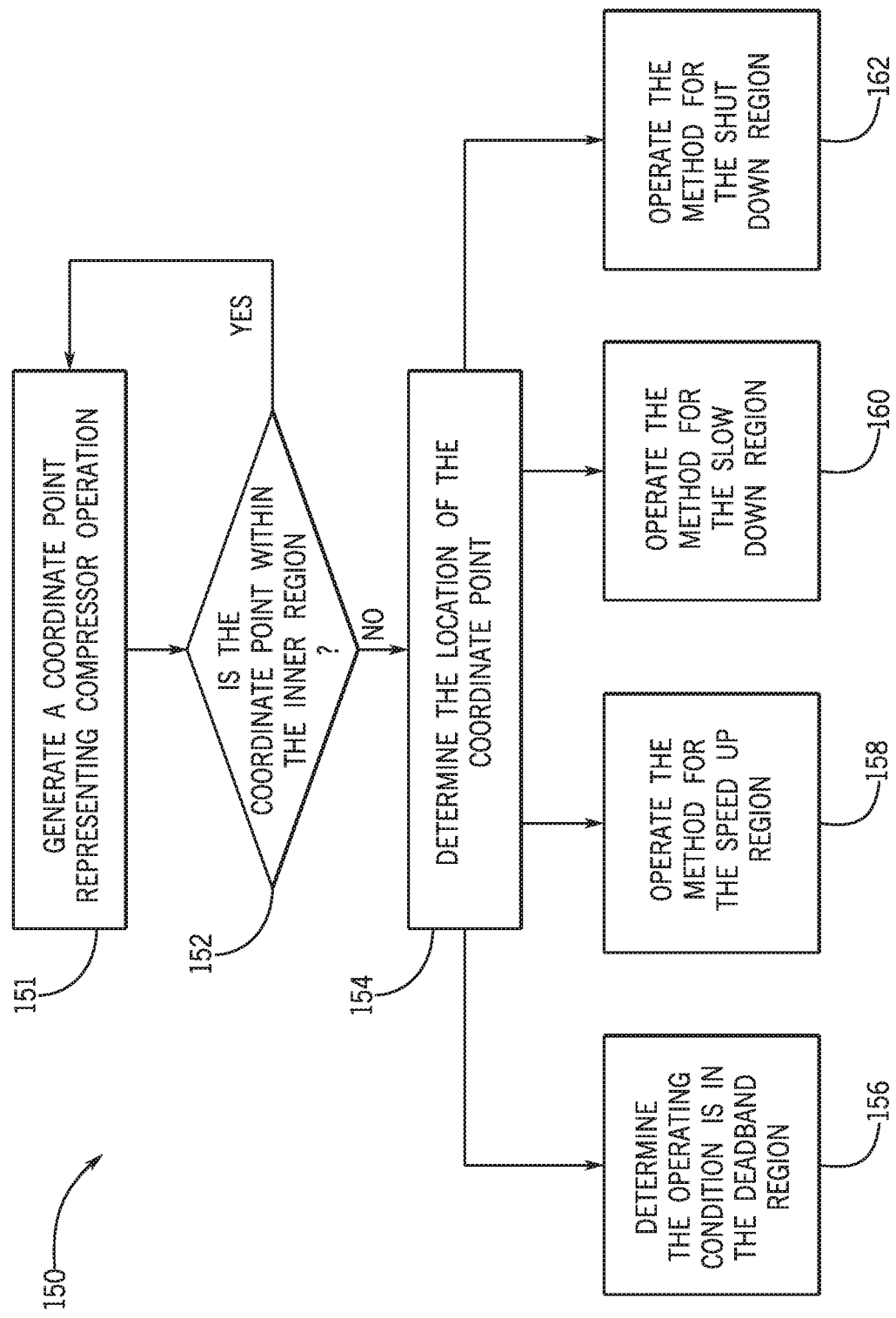
FIG. 7 is a flowchart of a process for determining an operating condition of a compressor, using the graph of FIG. 6, in accordance with an aspect of the present disclosure.

An embodiment of a process 150 for adjusting operation of the compressor 74 is illustrated in FIG. 7. When the compressor 74 begins operation, the compressor 74 may operate between an initial range of operating speeds that includes an initial lower threshold speed and an initial upper threshold speed. Throughout operation, as shown in block 151, a compressor operation coordinate point is generated by using data associated with feedback indicative of the suction temperature of the refrigerant and the discharge temperature of the refrigerant, such as feedback from the first sensor 100 and/or the second sensor 101. The coordinate point may be compared to a graph, such as the graphical representation of the operational compressor envelope in FIG. 6 and/or a lookup table. Generally, the compressor operation coordinate point represents a performance of the HVAC system 99, such that the operating conditions of a compressor 74 of the HVAC system 99 may be adjusted based on the compressor operation coordinate.

In block 152, the location of the generated compressor operation coordinate point is compared to the control scheme 102, which may include a graph or lookup table. Specifically, it is determined whether or not the compressor operation coordinate point is within the inner region 106, or the target region. If the compressor operation coordinate point is within the inner region 106, no change to the initial range of operating speeds of the compressor 74 is made and the compressor 74 continues to operate between the initial lower threshold speed and the initial upper threshold speed. Further, in some embodiments, compressor operation coordinate points are continuously generated to monitor the performance of the compressor 74. If the compressor operation coordinate point is determined to be outside of the inner region 106 of the control scheme 102, further action may be taken.

Specifically, further analysis to determine where the compressor operation coordinate defined by the operating conditions is positioned with respect to the control scheme 102 is performed, as shown in block 154. For example, the compressor operation coordinate defined by the operating conditions may be determined to be in the deadband region 110 or in one of the outer deadband regions 126, as shown in block 156. In this case, no adjustment to the initial range of operating speeds of the compressor 74 is made. The compressor operation coordinate defined by the operating conditions may also be determined to be in the speed up region 128. In response, as shown in block 158, a process for adjusting the operation of the compressor 74 in the speed up region 128 is performed. Specifically, the speed of the compressor 74 may be increased to return the operating conditions to a position within the inner region 106. Additionally, the compressor operation coordinate defined by the operating conditions may be determined to be in the slow down region 130 and as a result, as shown in block 160, a process for adjusting the operation of the compressor 74 in the slow down region 130 is performed to reduce the speed of the compressor 74 to return the operating conditions to a position within inner region 106. Further, the compressor operation coordinate defined by the operating conditions may be determined to be in the shut down region 132. In such cases, a method for shutting down the compressor 74, as shown in block 162, is performed.

Figure 8:
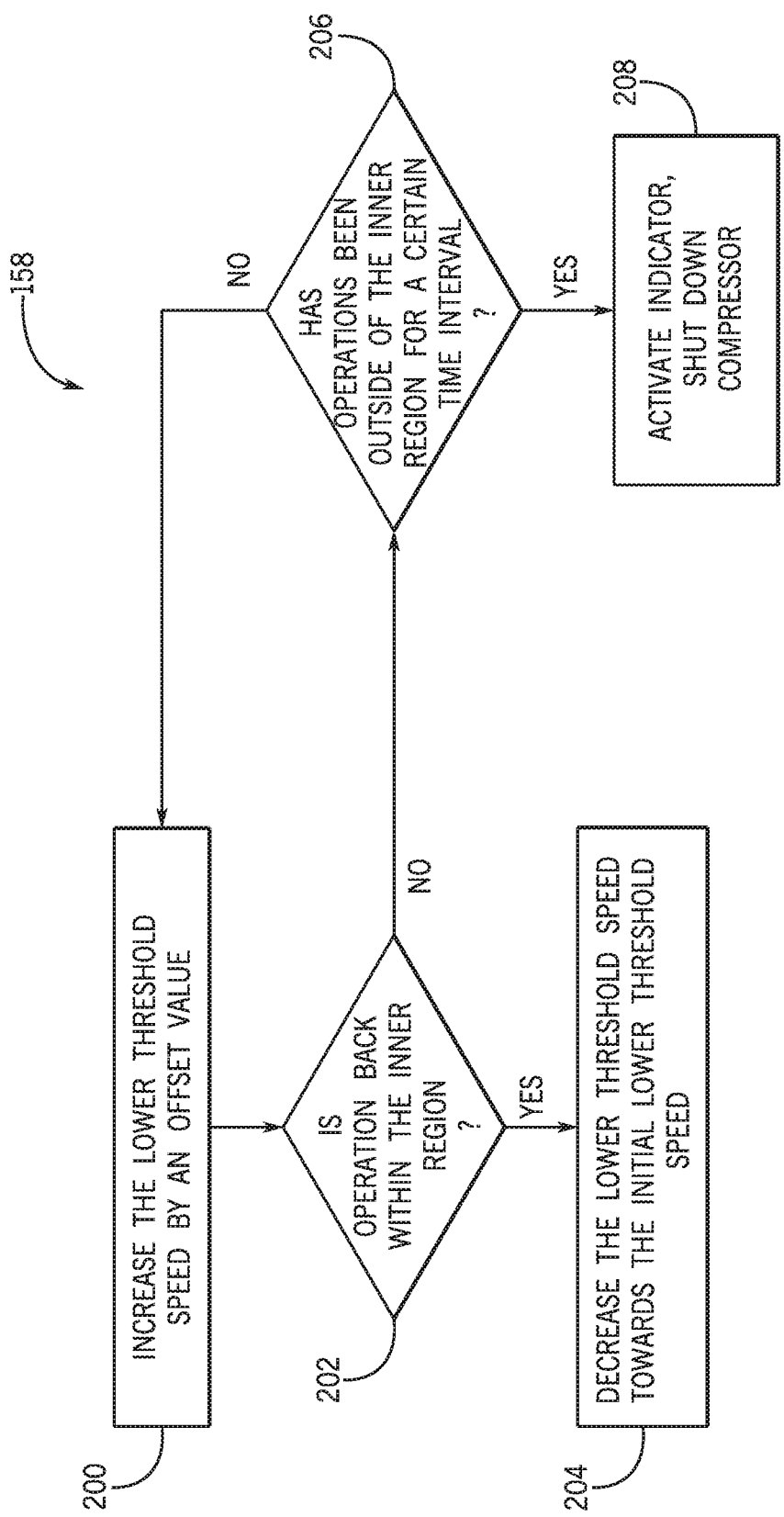
FIG. 8 is a flowchart of a process for adjusting a speed of a compressor in a speed up region of the graph of FIG. 6, in accordance with an aspect of the present disclosure.

FIG. 8 illustrates block 158 of FIG. 7 in greater detail. Specifically, FIG. 8 is a block diagram of a process for adjusting the operation of the compressor 74 when the compressor operation coordinate defined by the operating conditions is in the speed up region 128. As described above, when the compressor operation coordinate defined by the operating conditions falls within the inner region 106, the compressor 74 may operate within a target range of operating speeds, bounded by a lower threshold speed and an upper threshold speed. However, when the compressor operation coordinate defined by the operating conditions is in the speed up region 128, the target range of operating speeds may be adjusted.

For example, in block 200, the lower threshold speed of the target range of operating speeds is increased by an offset value. Specifically, the lower threshold speed may increase by a set rate, such as 1 RPM of the motor 94 per second, or a percentage rate, such as 1% per second. In some embodiments, the upper threshold speed may remain constant at the initial upper threshold while the lower threshold speed is adjusted. As such, the target range of operating speeds changes and the speed of the compressor 74 will be controlled to be between a new lower threshold speed and the initial upper threshold speed. As discussed above, the adjustment of the lower threshold speed may depend on where the compressor operation coordinate defined by the operating conditions is located with respect to the control scheme 102. For example, if the compressor operation coordinate defined by the operating conditions is in the speed up region 128 and is proximate to the boundary 134, the offset value applied to the lower threshold speed may increase as compared to when the compressor operation coordinate is proximate to the boundary 112.

In block 202, the controller determines whether the compressor operation coordinate defined by the operating condition is within the inner region 106. If it is determined that the coordinate is within the inner region 106, the offset value is removed, such that the lower threshold speed decreases towards the initial lower threshold speed, as shown in block 204. As such, the target range of operating speeds is adjusted towards the initial range of operating speeds. In some embodiments, the lower threshold speed may be decreased by a set rate or a percentage rate, so long as the compressor operation coordinate defined by the operating condition is within the inner region 106.

If the controller determines that the compressor operation coordinate defined by the operating conditions has not returned to within the inner region 106, then further analysis of the operating parameters of the HVAC system 99 may be performed. In some embodiments, a duration, or time value associated with the duration, in which the compressor operation coordinate has been outside of the inner region 106 may be monitored by the controller, as shown in block 206. If the time value has not exceeded a time interval threshold, the lower threshold speed may continue to increase, thereby increasing the speed of the compressor 74. However, if the time value has been determined to exceed the time interval threshold, an indicator may be activated and the compressor 74 may shut down, as shown in block 208. In some embodiments, the time interval may be a set value, such as 5 minutes.

As such, the lower threshold speed may continue to increase until the compressor operation coordinate defined by the operating parameter returns to within the inner region 106 or until the compressor 74 shuts down. In some embodiments, the time value resets when the compressor operation coordinate defined by the operating parameter returns to within the inner region 106. At the same time, the lower threshold speed may be reduced. In some embodiments, the lower threshold speed is reduced at a rate depending on the position of the compressor operation coordinate defined by the operating parameters with respect to the control scheme 102. For example, the lower threshold speed may be reduced at a higher rate if the compressor operation coordinate is in a more central location within the inner region 106 than if the compressor operation coordinate is more proximate to the boundary 108. In additional or alternative embodiments, the time value may not reset when the compressor operation coordinate defined by the operating parameters moves from the speed up region 128 to the deadband region 110 or to the outer deadband regions 126, even though the range of operating speeds is not adjusted.

Figure 9:
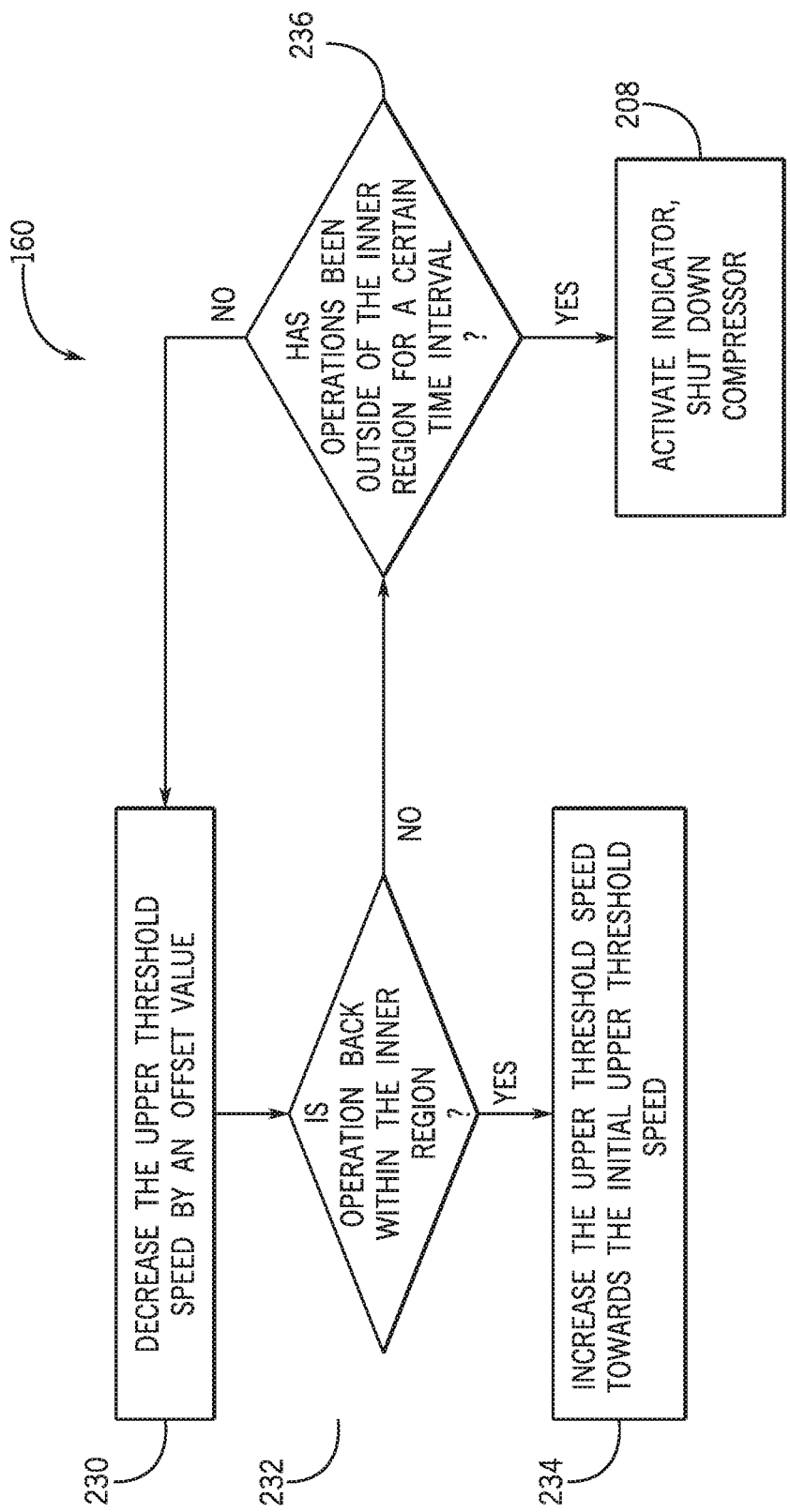
FIG. 9 is a flowchart of a process for adjusting a speed of the compressor in a slow down region of the graph of FIG. 6, in accordance with an aspect of the present disclosure.

FIG. 9 illustrates block 160 of FIG. 7 in further detail. Specifically, FIG. 9 is a block diagram of process for adjusting the speed of the compressor 74 when the compressor operation coordinate defined by the operating conditions is within the slow down region 130. The process of FIG. 9 includes similar steps as those described above for FIG. 8. In block 230, the upper threshold speed of the target range of operating speeds decreases by an offset value, such as at a set rate or at a percentage rate. Similar to block 200, the offset value applied to the upper threshold speed may increase if the compressor operation coordinate is determined to be further outside of the boundary 112. In some embodiments, the lower threshold speed of the compressor 74 may remain constant at the initial lower threshold speed.

Accordingly, the speed of the compressor 74 will be set between the lower threshold speed and a new upper threshold speed.

In block 232, the controller determines whether the compressor operation coordinate defined by the operating conditions has returned to within the inner region 106. If it is determined that the compressor operation coordinate is within the inner region 106, the target range of operating speeds is adjusted toward the initial range of operating speeds, as shown in block 234. Accordingly, the upper threshold speed increases towards the initial upper threshold speed, such as at a set rate or at a percentage rate, while the lower threshold speed may remain constant. The rate at which the upper threshold speed increases may depend on the position of the compressor operation coordinate defined by the operating conditions within the inner region 106. For example, a rate of increasing the upper threshold speed may increase at a higher rate when the position of the compressor operation coordinate defined by the operating conditions is in a central location within inner region 106 than if the compressor operation coordinate is proximate to the boundary 108.

If the compressor operation coordinate defined by the operating conditions is determined to remain outside of the inner region 106, further analysis of the operating parameters of the HVAC system 99 may be performed, similar to the steps described in FIG. 8. That is, in block 236, a time value at which the compressor operation coordinate defined by the operating parameters is outside of the inner region 106 may be determined. If the time value has not exceeded a time interval, such as 5 minutes, the steps in block 230 and block 232 may be repeated until the time interval has been exceeded. In that case, an indicator may be activated and the compressor 74 may shut down, as shown in block 208.

Thus, similar to FIG. 8, the target range of operating speeds of the compressor 74 is adjusted until the compressor operation coordinate defined by the operating conditions is within the inner region 106 or until the compressor 74 shuts down. Also, the time value may reset when the compressor operation coordinate defined by the operating conditions is within the inner region 106 and/or the upper threshold speed may be reduced at that time. However, the time value may not reset when the operation of the compressor 74 is within the deadband region 110 or the outer deadband regions 126.

Figure 10:
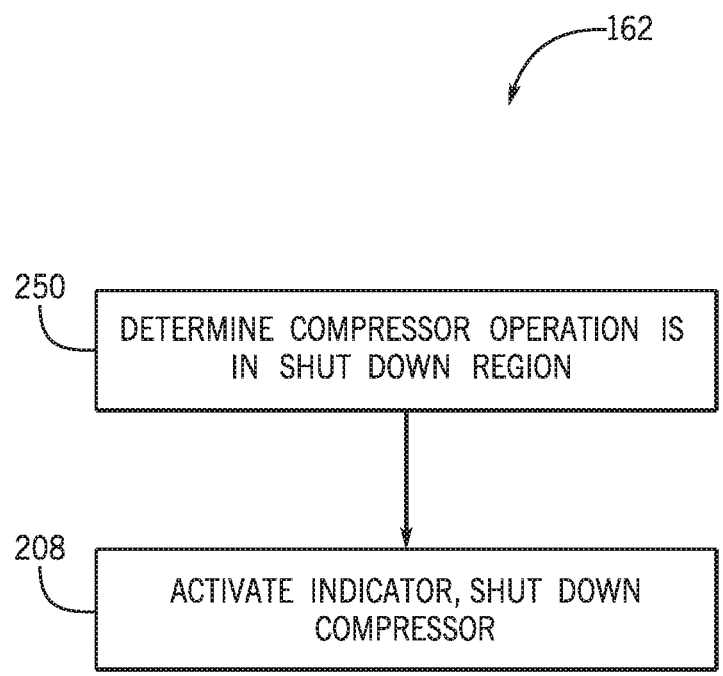
FIG. 10 is a flowchart of a process for shutting down the compressor in a shut down region of the graph of FIG. 6, in accordance with an aspect of the present disclosure.

FIG. 10 illustrates block 162 of FIG. 7 in detail. Specifically, FIG. 10 is a block diagram of method process for adjusting the speed of the compressor 74 when the compressor operation coordinate defined by the operating conditions is in the shut down region 132. In block 250, the compressor operation coordinate defined by the operating conditions is determined to be within the shut down region 132. As a result, an indicator may be activated and the compressor 74 may shut down, as shown in block 208. In other words, unlike for blocks 158 and 160 of FIG. 7, the compressor 74 is shut down before the target range of operating speeds is adjusted.

Figure 11:
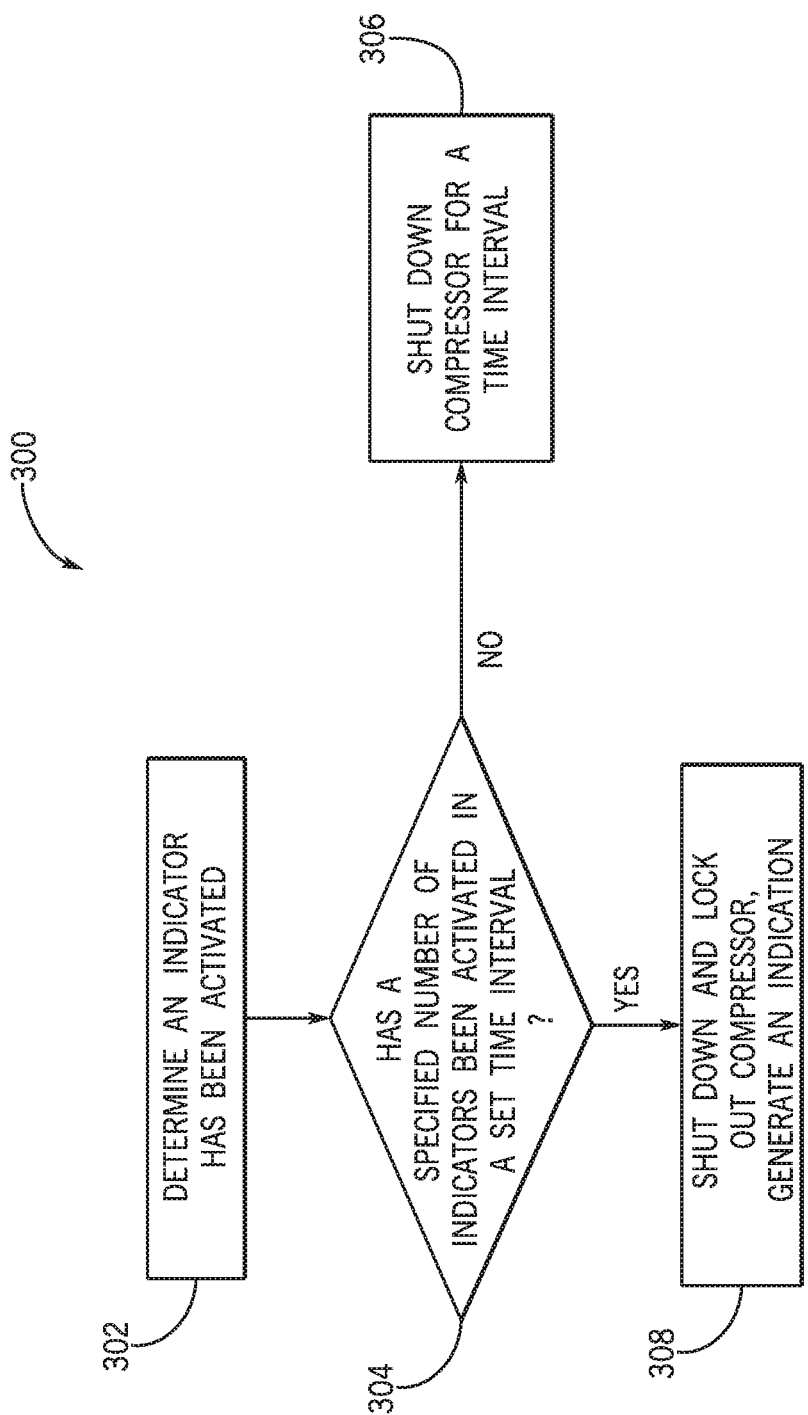
FIG. 11 is a flowchart of a process for performing actions after shutting down the compressor, in accordance with an aspect of the present disclosure.

In some embodiments, further actions may be performed after the compressor 74 has shut down. FIG. 11 illustrates a process 300 for performing such further actions. In block 302, the indicator has been activated and the compressor 74 has shut down. The information related to each shut down of the compressor 74 may be stored in the non-volatile memory 88 control board 82, for instance. Specifically, the control board 82 may determine whether a target number of indicators has been activated over a set time interval, as shown in block 304. For example, the control board 82 may determine whether or not there have been more than 3 indicators activated over the past 120 minutes. If the target number of shut downs has not been exceeded, the compressor 74 may be shut down for a time interval, as shown in block 306. After the time interval, the compressor 74 may automatically resume operating at a speed within the initial range of operating speeds. For example, the compressor 74 may automatically resume operating after 10 minutes, or another suitable time interval.

If the number of activated indicators has exceeded the previously specified number, the compressor 74 may remain shut down and generate an indication to notify an operator, as shown in block 308. In some embodiments, the compressor 74 may remain locked out until a user manually resets the compressor 74, such as via a user interface. In some embodiments, the indication may be a light, a sound, a text notification, or any combination thereof. The indication enables operators to easily identify that the HVAC system 99 has frequently been operating outside of the inner region 106. As such, an operator may perform maintenance on the compressor 74 and/or other components of the HVAC system 99, to enable the HVAC system 99 to operate more frequently within the inner region 106.

The methods described in FIGS. 7-11 may be performed by a control system, such as the control panel 82. For example, the microprocessor 86 may be programmed to perform each of the methods. In some embodiments, the methods may not be available immediately upon startup of the compressor 74. That is, the microprocessor 86 may include a delay before the control system may begin executing the methods of FIGS. 7-11. As such, the compressor 74 may reach substantially steady state operation before the methods are performed. By way of example, the control system may not be able to execute the methods until 60 seconds after the compressor 74 begins operation.

As set forth above, embodiments of the present disclosure may provide one or more technical effects useful in the operation of HVAC systems. For example, a speed of a compressor may be controlled based on feedback associated with operating parameters of the HVAC system. Further, a control system may determine whether such feedback is within an operational envelope that is graphically or tabularly represented using suction temperatures and discharge temperatures of a refrigerant flowing through the compressor. When the feedback is not within a target region of the operational envelope, a target range of speeds of the compressor may be adjusted. For example, a lower threshold speed of the target range of operating speeds is increased to increase the speed of the compressor or an upper threshold speed of the target range of operating speeds is reduced to decrease the speed of the compressor. The control system may continue to monitor the operating parameters of the HVAC system after adjusting the target range of speeds and continuously adjust the target range of speeds if the operating parameters have not returned to within a target region of the operational envelope. Additionally, the control system may shut down the compressor if the operating parameters do not return to within the target region within a certain time and/or if the temperatures are determined to be beyond threshold temperatures of the envelope. The technical effects and technical problems in the specification are examples and are not limiting. It should be noted that the embodiments described in the specification may have other technical effects and can solve other technical problems.

While only certain features and embodiments of the disclosure have been illustrated and described, many modifications and changes may occur to those skilled in the art, such as variations in sizes, dimensions, structures, shapes and proportions of the various elements, values of parameters, mounting arrangements, use of materials, colors, orientations, and the like, without materially departing from the novel teachings and advantages of the subject matter recited in the claims. The order or sequence of any process or method steps may be varied or re-sequenced according to alternative embodiments. It is, therefore, to be understood that the appended claims are intended to cover all such modifications and changes as fall within the true spirit of the disclosure. Furthermore, in an effort to provide a concise description of the exemplary embodiments, all features of an actual implementation may not have been described, such as those unrelated to the presently contemplated best mode of carrying out the disclosed embodiments, or those unrelated to enabling the claimed embodiments. It should be appreciated that in the development of any such actual implementation, as in any engineering or design project, numerous implementation specific decisions may be made. Such a development effort might be complex and time consuming, but would nevertheless be a routine undertaking of design, fabrication, and manufacture for those of ordinary skill having the benefit of this disclosure, without undue experimentation.

The invention claimed is:

1. A heating, ventilation, and air conditioning (HVAC) system, comprising:
a compressor comprising a discharge port and a suction port, wherein the compressor is configured to compress a working fluid;
a first sensor configured to provide feedback corresponding to a first temperature of the working fluid exiting the compressor proximate the discharge port;
a second sensor configured to provide feedback corresponding to a second temperature of the working fluid entering the compressor proximate the suction port; and
an automation controller storing data indicative of an operational envelope for the compressor, wherein the operational envelope defines compressor operation coordinates corresponding to a range of suction temperatures and a range of discharge temperatures inside and outside of a target region of the operational envelope, and wherein the automation controller is configured to:
control a target range of speeds of the compressor based on a comparison of the target region to an operation coordinate defined by the feedback from the first sensor and the feedback from the second sensor;
increase a lower threshold speed of the target range of speeds based on a determination that the operation coordinate is within a first control region of the operational envelope; and
decrease an upper threshold speed of the target range of speeds based on a determination that the operation coordinate is within a second control region of the operational envelope, wherein the first control region and the second control region are outside of and collectively surround the target region of the operational envelope.

2. The HVAC system of claim 1, wherein the automation controller is configured to adjust the lower threshold speed or the upper threshold speed at a set rate based at least on the comparison of the target region to the operation coordinate.

3. The HVAC system of claim 1, wherein the automation controller is configured to monitor a time value associated with a duration in which the operation coordinate defined by the feedback from the first sensor and the feedback from the second sensor is outside of the target region.

4. The HVAC system of claim 3, wherein the automation controller is configured to shut down the compressor in response to the time value exceeding a time threshold.

5. The HVAC system of claim 4, wherein the automation controller is configured to reset the time value in response to the operation coordinate defined by the feedback from the first sensor and the feedback from the second sensor being within the target region.

6. The HVAC system of claim 1, wherein the automation controller is configured to shut down the compressor based on a determination that the operation coordinate defined by the feedback from the first sensor and the feedback from the second sensor is located in a third control region of the operational envelope, wherein the third control region is outside of the target region, the first control region, and the second control region of the operational envelope.

7. The HVAC system of claim 1, wherein the automation controller is configured to maintain the target range of speeds based on a determination that the operation coordinate defined by the feedback from the first sensor and the feedback from the second sensor is located in a third control region of the operational envelope, wherein the third control region is between the target region and the first control region and between the target region and the second control region of the operational envelope.

8. The HVAC system of claim 1, wherein the automation controller is configured to operate the compressor at a speed included in the target range of speeds of the compressor.

9. The HVAC system of claim 1, wherein the feedback from the first sensor, the feedback from the second sensor, or both, comprises a pressure of the working fluid, a flow rate of the working fluid, a speed of a motor configured to drive the compressor, or any combination thereof.

10. The HVAC system of claim 1, wherein the target region comprises a plurality of first coordinates, wherein each first coordinate of the plurality of first coordinates comprises a respective first suction temperature and a respective first discharge temperature, wherein the first control region comprises a plurality of second coordinates, wherein each second coordinate of the plurality of second coordinates comprises a respective second suction temperature and a respective second discharge temperature, and wherein, for any second coordinate of the plurality of second coordinates compared to any first coordinate of the plurality of first coordinates, the respective second suction temperature is greater than the respective first suction temperature, the respective second discharge temperature is less than the respective first discharge temperature, or both.

11. The HVAC system of claim 1, wherein the target region comprises a plurality of first coordinates, wherein each first coordinate of the plurality of first coordinates comprises a respective first suction temperature and a respective first discharge temperature, wherein the second control region comprises a plurality of second coordinates, wherein each second coordinate of the plurality of second coordinates comprises a respective second suction temperature and a respective second discharge temperature, and wherein, for any second coordinate of the plurality of second coordinates compared to any first coordinate of the plurality of first coordinates, the respective second suction temperature is less than the respective first suction temperature, the respective second discharge temperature is greater than the respective first discharge temperature, or both.

12. A heating, ventilation, and air conditioning (HVAC) system, comprising:
- a compressor comprising a discharge port and a suction port, wherein the compressor is configured to compress a working fluid; and
- an automation controller configured to:
  - receive feedback from a first sensor corresponding to a first temperature of the working fluid exiting the compressor proximate to the discharge port of the compressor;
  - receive feedback from a second sensor corresponding to a second temperature of the working fluid entering the compressor proximate to the suction port of the compressor;
  - compare an operation coordinate defined by the feedback from the first sensor and the feedback from the second sensor with a target region of an operational envelope, wherein the operational envelope defines compressor operation coordinates corresponding to a range of suction temperatures and a range of discharge temperatures inside and outside of the target region of the operational envelope;
  - control a lower speed limit, an upper speed limit, or both of the compressor based at least on the comparison of the operation coordinate defined by the feedback from the first sensor and the feedback from the second sensor with the target region of the operational envelope; and
  - maintain the lower speed limit and the upper speed limit of the compressor based on the operation coordinate transitioning from the target region into a deadband region that is outside of the target region.

13. The system of claim 12, wherein the automation controller is configured to adjust the lower speed limit of the compressor toward an initial lower speed limit and adjust the upper speed limit of the compressor toward an initial upper speed limit based on a determination that the operation coordinate defined by the feedback from the first sensor and the feedback from the second sensor is in the target region of the operational envelope.

14. The system of claim 13, wherein the automation controller is configured to increase the lower speed limit of the compressor based on a determination that the operation coordinate defined by the feedback from the first sensor and the feedback from the second sensor is in a first control region of the operational envelope, wherein the first control region is outside of the target region.

15. The system of claim 14, wherein the automation controller is configured to decrease the upper speed limit of the compressor based on a determination that the operation coordinate defined by the feedback from the first sensor and the feedback from the second sensor is in a second control region of the operational envelope, wherein the second control region is outside of the target region.

16. The system of claim 15, wherein the deadband region surrounds the target region, extends between the target region and the first control region, between the target region and the second control region, between the first control region and the second control region, or any combination thereof.

17. The system of claim 16, wherein the automation controller is configured to monitor a time value associated with a duration in which the operation coordinate defined by the feedback from the first sensor and the feedback from the second sensor is in the first control region, the second control region, or the deadband region of the operational envelope.

18. The system of claim 17, wherein the automation controller is configured to reset the time value in response to the operation coordinate defined by the feedback from the first sensor and the feedback from the second sensor being in the target region.

19. The system of claim 16, wherein the automation controller is configured to shut down the compressor in response to the operation coordinate defined by the feedback from the first sensor and the feedback from the second sensor being in a fourth control region of the operational envelope, wherein the fourth control region is outside of and offset from the first control region, outside of and offset from the second control region, and outside of and offset from the deadband region.

20. A heating, ventilation, and air conditioning (HVAC) system controller comprising a tangible, non-transitory, computer-readable medium comprising computer-executable instructions which, when executed, are configured to cause a processor to:
- receive feedback from a first sensor corresponding to a first temperature of a working fluid exiting a compressor proximate to a discharge port of the compressor;
- receive feedback from a second sensor corresponding to a second temperature of the working fluid entering the compressor proximate to a suction port of the compressor;
- compare an operation coordinate defined by the feedback from the first sensor and the feedback from the second sensor with a target region of an operational envelope, wherein the operational envelope defines compressor operation coordinates corresponding to a range of suction temperatures and a range of discharge temperatures inside and outside of the target region of the operational envelope; and
- control a target speed range of the compressor based at least on the comparison of the operation coordinate defined by the feedback from the first sensor and the feedback from the second sensor with the target region of the operational envelope;
- increase a lower threshold speed of the target speed range based on the operation coordinate being in a first control region of the operational envelope; and
- decrease an upper threshold speed of the target speed range based on the operation coordinate being in a second control region of the operational envelope, wherein the first control region and the second control region are outside of and collectively surround the target region of the operational envelope.

21. The controller of claim 20, wherein the computer-executable instructions are configured to cause the processor to maintain the target speed range in response to the operation coordinate defined by the feedback from the first sensor and the feedback from the second sensor being in the target region.

22. The controller of claim 20, wherein the computer-executable instructions are configured to cause the processor to monitor a time value associated with a duration that the operation coordinate defined by the feedback from the first sensor and the feedback from the second sensor is outside the target region, wherein the processor is configured to shut down the compressor based on a determination that the time value exceeds a time threshold, and wherein the processor is configured to reset the time value in response to the operation coordinate defined by the feedback from the first sensor and the feedback from the second sensor being in the target region.

* * * * *